US 11,880,841 B2

(12) United States Patent
Gilbey et al.

(10) Patent No.: US 11,880,841 B2
(45) Date of Patent: Jan. 23, 2024

(54) IDENTITY VALIDATION SYSTEM AND METHOD

(71) Applicant: MASTERCARD ASIA/PACIFIC PTE. LTD., Singapore (SG)

(72) Inventors: Benjamin Gilbey, Singapore (SG); Abhinava Srivastava, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

(21) Appl. No.: 17/199,875

(22) Filed: Mar. 12, 2021

(65) Prior Publication Data
US 2021/0342842 A1    Nov. 4, 2021

(30) Foreign Application Priority Data

Apr. 30, 2020   (SG) .............................. 10202003972P

(51) Int. Cl.
*G06Q 20/40* (2012.01)
*G06Q 30/018* (2023.01)

(52) U.S. Cl.
CPC ....... *G06Q 20/4014* (2013.01); *G06Q 30/018* (2013.01)

(58) Field of Classification Search
CPC .......................... G06Q 20/4014; G06Q 30/018
USPC ......................................................... 705/44
See application file for complete search history.

(56) References Cited

U.S. PATENT DOCUMENTS

| 9,189,788 B1* | 11/2015 | Robinson ......... G06Q 20/40145 |
| 9,760,871 B1* | 9/2017 | Pourfallah ............. G06Q 10/10 |
| 2009/0132813 A1* | 5/2009 | Schibuk ............. G06Q 20/4014 726/9 |
| 2015/0295906 A1* | 10/2015 | Ufford ................ H04L 63/0815 726/6 |

(Continued)

FOREIGN PATENT DOCUMENTS

| CA | 2985808 A1 * | 11/2016 | ............. G06Q 20/32 |
| WO | WO-2019074882 A1 * | 4/2019 | ............. G06F 21/45 |

OTHER PUBLICATIONS

U.S. Payments Forum: EMV Payments Tokenization Primer and Lessons Learned, Jun. 2019, Version 1.0, pp. 1-43 (Year: 2019.*

(Continued)

*Primary Examiner* — Bijendra K Shrestha
(74) *Attorney, Agent, or Firm* — Harness, Dickey & Pierce, P.L.C.

(57) ABSTRACT

A system for routing an identity validation request comprises at least one processor in communication with computer-readable storage, the computer-readable storage having stored thereon instructions for causing the at least one processor to: receive, from a requesting device, an identity validation request, the identity validation request comprising identity data and a payment credential; determine, from the payment credential, an issuer of the payment credential; transmit, to the issuer, a verification service request message that comprises the identity data and the payment credential; receive, from the issuer, a verification service response indicating whether or not the identity data has previously been associated with the payment credential; and based on the verification service response, transmit, to the requesting device, an indication as to validity of the identity data.

18 Claims, 7 Drawing Sheets

(56) References Cited

U.S. PATENT DOCUMENTS

| | | | | |
|---|---|---|---|---|
| 2015/0339667 | A1* | 11/2015 | Dua | G06Q 20/327 |
| | | | | 705/16 |
| 2018/0005238 | A1* | 1/2018 | Hammad | H04L 63/0853 |
| 2018/0181964 | A1* | 6/2018 | Zagarese | G06Q 20/40145 |
| 2020/0167775 | A1* | 5/2020 | Reese | G06Q 20/38215 |
| 2020/0349639 | A1* | 11/2020 | Mousseau | G06Q 20/04 |
| 2021/0065311 | A1* | 3/2021 | Baugier | G06Q 40/125 |
| 2021/0243194 | A1* | 8/2021 | Nelsen | G06F 21/41 |

OTHER PUBLICATIONS

Kovacs, Edward: Tokenization: Benefits and Challenges for Securing Transaction Data, Nov. 4, 2014, Data Protection, pp. 1-23 (Year: 2014).*

Mohanty, Biswarajan: How to use JSON Web Token (JWT) validation policy, Oct. 3, 2019, salesforce, pp. 1-8 (Year: 2019).*

* cited by examiner

IDENTITY VALIDATION SYSTEM AND METHOD

CROSS-REFERENCE TO RELATED APPLICATION

This application claims the benefit of, and priority to, Singapore Patent Application No. 10202003972P filed on Apr. 30, 2020. The entire disclosure of the above application is incorporated herein by reference.

FIELD

The present disclosure relates to a system and method for validating an identity of an individual.

BACKGROUND

This section provides background information related to the present disclosure which is not necessarily prior art.

Many situations call for validation of a person's identity. For example, merchants are often faced with the issue of validating the identity of a consumer, for example, as part of an enrolment or on-boarding process for an online service. In another example, a merchant, or employee of the merchant, may be required by law to verify that the consumer is above a certain age for purchases, such as alcohol. Age verification is typically performed by the consumer providing the merchant with a form of identification, typically a government-issued document, such as a driver's license, which the merchant then validates by inspection.

It may not be possible for a merchant to readily determine if an identification document presented by a consumer is genuine or fraudulent. In addition, the consumer may be a tourist or foreigner and as such, the identity document provided may be issued by a foreign government and/or may be in a language that is unfamiliar to the merchant.

In a further example, it may be a requirement in certain countries that guests of a hotel provide some form of identification at the time of check-in. Typically, the employee of the hotel makes a copy of the identity document, such as a passport, and stores it. It is difficult for the hotel staff to be able to validate that the guest is indeed the holder of the identity document and to verify that the identity document is genuine.

For online purchases, there is no reliable mechanism for validating the identity of a consumer. For example, an e-store that offers products for delivery may not be able to verify the age of a consumer, other than by prompting the consumer to confirm that they are above a certain age threshold before they are allowed to purchase alcohol. In these circumstances, often no further verification is required beyond the consumer selecting the option, "Yes, I am above 18 years old" (for example).

Existing systems therefore fail to provide a secure and reliable method of verifying the identity of a consumer. It is desirable therefore to overcome or alleviate one or more of the above-identified issues, or at least to provide a useful alternative.

SUMMARY

This section provides a general summary of the disclosure, and is not a comprehensive disclosure of its full scope or all of its features. Aspects and embodiments of the disclosure are set out in the accompanying claims.

In a first aspect, the present disclosure relates to an identity validation system comprising: at least one processor in communication with computer-readable storage, the computer-readable storage having stored thereon instructions for causing the at least one processor to: (i) receive, from a requesting device, an identity validation request, the identity validation request comprising identity data and a payment credential; (ii) determine, from the payment credential, an issuer of the payment credential; (iii) transmit, to the issuer, a verification service request message that comprises the identity data and the payment credential; (iv) receive, from the issuer, a verification service response indicating whether or not the identity data has previously been associated with the payment credential; and (v) based on the verification service response, transmit, to the requesting device, an indication as to validity of the identity data.

The identity data may comprise an identifier of an identity document. For example, the identity document may be one of: a passport; a driver's licence; or a government issued identity card.

In some embodiments, the identity data is associated with a plurality of identifiers of respective identity documents; and wherein the verification service response comprises a positive indication as to validity of the identity data if all of the identifiers have previously been associated with the payment credential.

In some embodiments, the instructions further comprise instructions for causing the at least one processor to generate a confidence score based on payment data associated with the payment credential.

In some embodiments, the instructions further comprise instructions for causing the at least one processor to generate a token to be sent to the requesting device for storage at the requesting device.

The verification service request message may be an ISO 8583 or ISO 20022 message, and the identity data may be encoded in a private data field of the ISO 8583 or ISO 20022 message.

The identity validation system may further comprise: an issuer system that is configured to: (i) parse the verification service request message to retrieve the identity data; (ii) perform a lookup operation to match one or more identifiers in the identity data to identifiers that have previously been stored in association with the payment credential; and (iii) transmit a verification service response indicating whether or not the one or more identifiers have previously been associated with the payment credential.

In some embodiments, the issuer system is configured to, prior to said lookup operation, perform a user verification operation comprising: (i) retrieving communication data associated with the payment credential; (ii) sending, to a user device, a request for user verification using the retrieved communication data; and (iii) wherein upon receipt of user verification from the user device, the issuer system is configured to perform the lookup operation.

In some embodiments, the user verification operation comprises one or more of: matching a received passcode with a passcode associated with the consumer; and matching received biometric data with biometric data associated with the consumer.

In some embodiments, the passcode is a string of alphanumeric characters issued by the issuer system to the user device.

In a second aspect, the present disclosure provides an identity validation method implemented by one or more processors, the method comprising: (i) receiving, from a requesting device, an identity validation request, the identity validation request comprising identity data and a payment credential; (ii) determining, from the payment credential, an issuer of the payment credential; (iii) transmitting, to the issuer, a verification service request message that comprises the identity data and the payment credential; (iv) parsing the verification service request message to retrieve the identity data; (v) performing a lookup operation to match one or more identifiers in the identity data to identifiers that have previously been stored in association with the payment credential; (vi) transmitting a verification service response indicating whether or not the one or more identifiers have previously been associated with the payment credential; and (vii) transmitting, to the requesting device based on the verification service response, an indication as to validity of the identity data.

The method may comprise a user verification operation comprising: retrieving communication data associated with the payment credential; sending, to a user device, a request for user verification using the retrieved communication data; and upon receipt of user verification from the user device, performing the lookup operation.

In some embodiments, the user verification operation of the above method comprises one or more of: matching a received passcode with a passcode associated with the consumer; and matching received biometric data with biometric data associated with the consumer.

In some embodiments of the method, the passcode is a string of alphanumeric characters issued by the issuer system to the user device.

In some embodiments of the method, the identity data comprises an identifier of an identity document, such as of a passport; a driver's licence; or a government issued identity card.

In some embodiments of the method, the identity data comprises a plurality of identifiers of respective identity documents; and wherein the verification service response comprises a positive indication as to validity of the identity data if all of the identifiers have previously been associated with the payment credential.

Some embodiments further comprise generating a confidence score based on payment data associated with the payment credential.

Some embodiments further comprise generating a token to be sent to the requesting device for storage at the requesting device.

In some embodiments of the method, the verification service request message is an ISO 8583 or ISO 20022 message, and wherein the identity data is encoded in a private data field of the ISO 8583 or ISO 20022 message.

In a third aspect of the present disclosure, there is provided one or more non-transitory computer-readable media for causing at least one processor to perform a method as disclosed herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Embodiments of the present disclosure will now be described, by way of non-limiting example, with reference to the drawings in which.

Corresponding reference numerals indicate corresponding parts throughout the several views of the drawings.

DETAILED DESCRIPTION

Figure 1A:
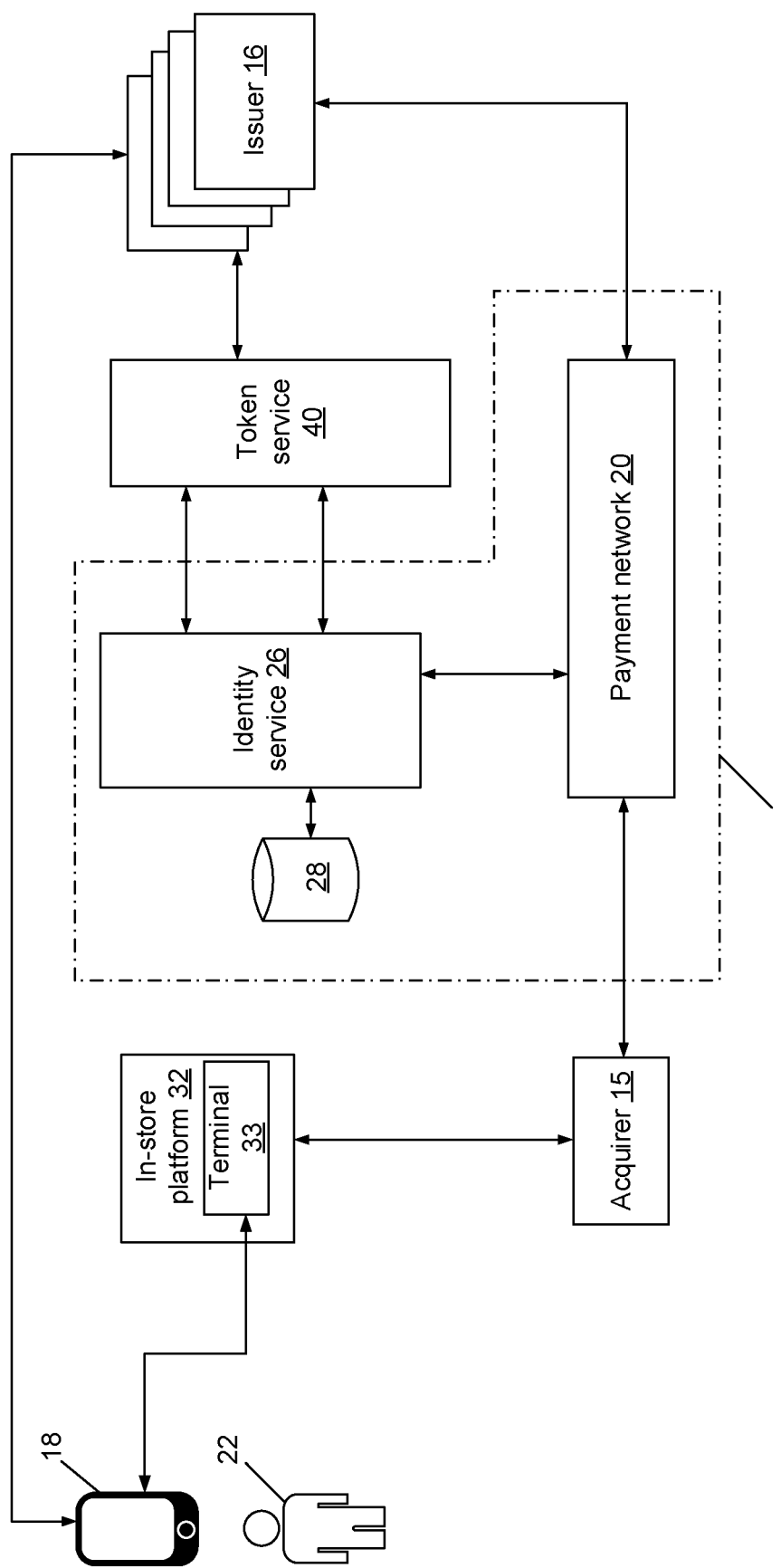
FIG. 1A is an architecture diagram of an example system for identity validation.

Example embodiments will now be described more fully with reference to the accompanying drawings. The description and specific examples included herein are intended for purposes of illustration only and are not intended to limit the scope of the present disclosure.

Embodiments of the disclosure provide an identity validation system. The identity validation system may be configured to receive, from a requesting device, an identity validation request, the identity validation request comprising identity data and a payment credential. For example, the identity validation system may be, or may comprise, a payment network, such as the Banknet® processing network operated by Mastercard® International, Inc.

The identity validation system may determine, from the payment credential, an issuer of the payment credential, and transmit, to the issuer, an account verification request message, such as an account status inquiry message, that comprises the identity data and the payment credential. Conventionally, an ISO based verification service is used for determining validity of a payment card (e.g., checking that the card has a valid number, is not expired, and that the corresponding account is in good standing). As used herein, the verification service is not for checking validity of the card, but rather for checking validity of information relating to the identity of an individual.

The identity validation system may also comprise an issuer system that is configured to parse the account status inquiry message to retrieve the identity data. A lookup operation is performed to match one or more identifiers in the identity data to identifiers that have previously been stored in association with the payment credential. The issuer system then transmits a verification service response indicating whether or not the one or more identifiers have previously been associated with the payment credential.

Based on the verification service response, an indication as to validity of the identity data may be transmitted to the requesting device.

Advantageously, the identity validation system makes use of the fact that issuer systems routinely store data relating to the identities of their customers, due to regulatory requirements such as "know your customer" (KYC) regulations. That data is stored in association with one or more payment credentials. Accordingly, identity validation requestors, such as merchants, may transmit a user's payment credential together with the identity information they wish to validate (such as a driver's licence number), and the request may be routed by, for example, a payment network using the payment credential, in a manner similar to a standard credit card or debit card transaction. However, rather than a transaction request, the validation request is sent as a non-financial request message in the form of a verification service request (such as an account status inquiry request). Accordingly, in at least some embodiments, existing payment system infrastructure may be used in an entirely new way to provide novel functionality to merchants and other identity validation requestors, such as healthcare providers.

Identity data validated by the system and method of the present disclosure may comprise one or more of: national ID; passport number; given name; surname; date of birth; address; and phone number. Payment credentials that may be associated with one or more of these may comprise primary account number (PAN) or a tokenized form thereof; expiry date; and card verification value (e.g., CVV2).

FIG. 1A shows an example system 10 which comprises an identity validation system 14 that is in communication with an identity validation requestor, in this case an in-store platform 32. The in-store platform may be, or may include, a point-of-sale (POS) system, for example. The architecture shown in FIG. 1A is suitable for implementation of in-store identity validation, i.e., situations in which a user 22 is in possession of a physical payment device, such as a payment card, or a payment-enabled contactless device such as a smartphone 18, and uses that physical payment device to interact with a suitably equipped reader such as a payment terminal 33.

The identity validation system 14 is also in communication with a plurality of issuer systems 16. Embodiments of the disclosure will be discussed below with reference to a single issuer system 16, but it will be appreciated that, in practice, many different issuers 16 can form part of the system 10. In some embodiments, one or more issuer systems 16 may be considered to be part of the identity validation system 14.

In-store platform 32 may make an identity validation request to the identity validation system 14, which processes the request and routes it to an appropriate issuer 16 based on its content. The identity validation request may be initiated by the in-store platform 32 receiving input from a user 22 whose identity is to be validated, for example, via a computing device of the user, such as mobile device 18, and/or via a merchant device, such as a point of sale (POS) terminal 33. For example, user 22 may tap, dip or swipe a payment card at terminal 33 to enable the terminal 33 to capture payment credentials, including a PAN and expiry date of the payment card. These payment credentials can then be sent by terminal 33 as part of an identity validation request. In another example, user 22 may tap mobile device 18, which has stored thereon one or more tokenized payment credentials (e.g., in association with a digital wallet of user 22), and terminal 33 may transmit the tokenized payment credentials as part of the identity validation request.

The identity validation system 14 may comprise one or more of: a payment network 20, such as Banknet® of Mastercard® International Inc.; an identity service 26 that is in communication with the payment network 20; and a data store 28 that may store information relating to issuers 16 that support identity validation.

The communication between the identity service 26 and the issuer 16 may be via ISO-based messages (e.g., ISO 8583 or ISO 20022), such as an account status inquiry (ASI) message, or may be via an issuer API.

In-store platform 32 may form the identity validation request (for example, via the POS terminal 33) and transmit the request to payment network 20 via acquirer 15, and the payment network 20 may thus be triggered to call the identity service 26.

System 10 also comprises a token service 40, such as Mastercard® Digital Enablement Service (MDES). The token service 40 may cooperate with issuer 16 to provide, to user 22 via his or her computing device 18, tokenized payment credentials that are more secure than raw payment credentials, such as primary account numbers (PANs).

A tokenized payment credential, or simply "payment token", is typically a substitute payment number that has the same format as a PAN, and is securely stored in association with the PAN in a token vault that is only accessible by token service 40. A payment token may also have certain rules associated with it (known in the art as domain controls) to further reduce the risk of fraud. For example, a token may be a single-use, limited-use (e.g., limited number of uses and/or time period in which it can be used), limited by total transaction value, and/or limited to use at specific merchants or in specific contexts (e.g., online transactions only). All this information is stored in relation to the token at token service 40, and can be provided to the issuer 16 to assist the issuer 16 in deciding whether to approve or decline a transaction.

Figure 1B:
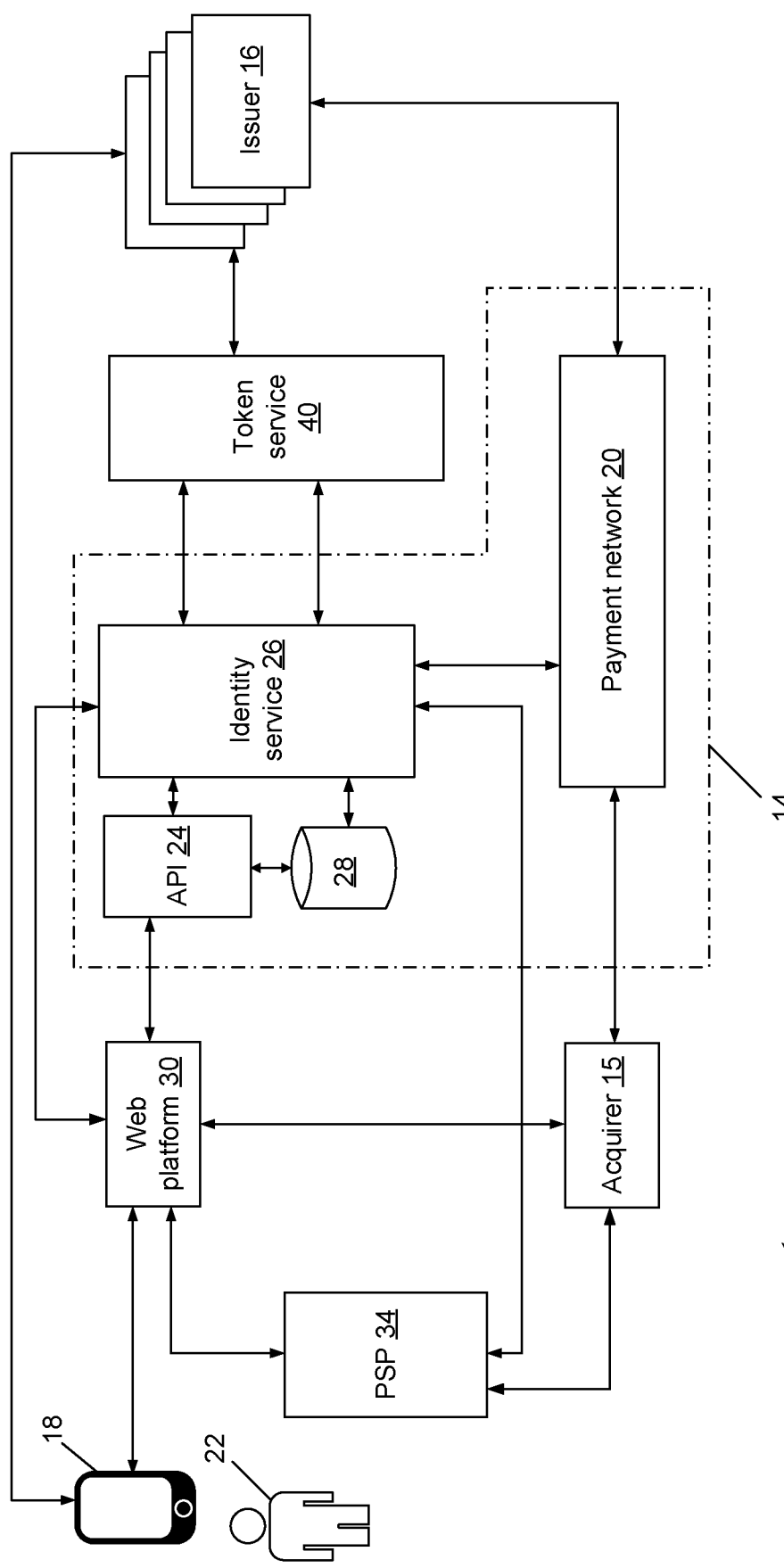
FIG. 1B is an architecture diagram of another example system for identity validation.

FIG. 1B shows an alternative architecture which is suitable for implementing identity validation in a "card not present" scenario. In FIG. 1B, a user 22 operating a computing device, such as smartphone 18, interacts with a merchant's web platform 30 (or alternatively, a mobile application server). In certain embodiments, the web platform 30 may cooperate with an acquirer system 15 and/or a payment service provider (PSP) system 34, to transmit identity validation requests to identity validation system 14, as appropriate and as described in further detail below.

The identity validation system 14 of FIG. 1B further comprises an identity service API 24 for making calls to the identity service 26, and in some embodiments, the web platform 30 may communicate directly with identity service 26, via API 24 (for example), to make identity validation requests. The identity service 26 may subsequently communicate with issuer 16 to request processing of the identity validation request at the issuer 16. The communication between the identity service 26 and the issuer 16 may be via ISO-based messages (e.g., ISO 8583 or ISO 20022), such as an account status inquiry (ASI) message, or may be via an issuer API.

In other embodiments, web platform 30 may communicate with payment network 20 via PSP 34 and acquirer 15, thereby triggering payment network 20 to call the identity service 26.

Figure 2:
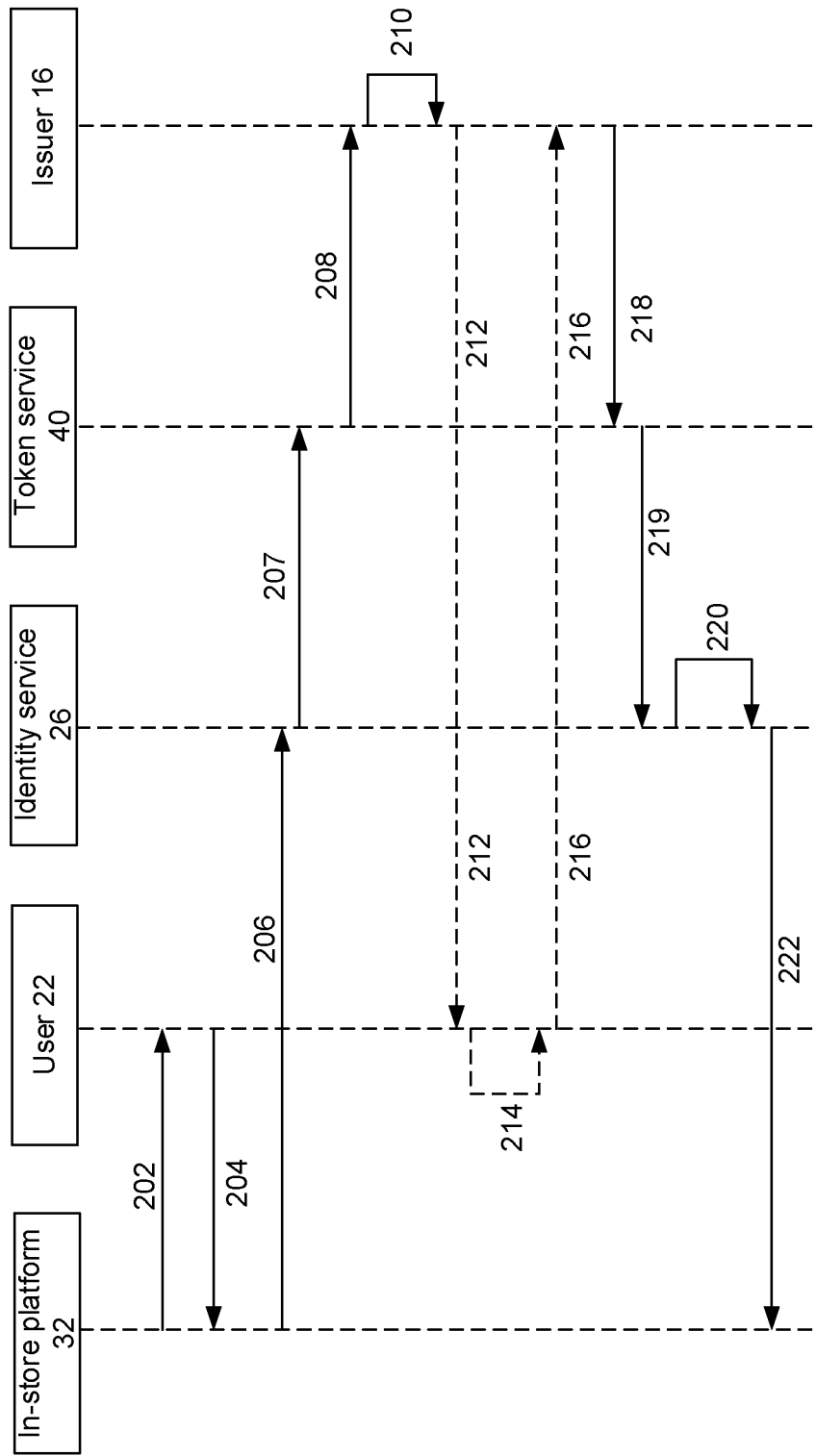
FIG. 2 is a sequence diagram of an embodiment of a process for identity validation.

FIG. 2 shows a sequence diagram of an example method 200 for validating an identity of a user 22, the identity validation method 200 being carried out in an "in-store" environment. Although referred to as "in-store", it will be appreciated that the method 200 is applicable in non-commerce contexts, such as in hospitals or other healthcare contexts where the primary purpose of identity validation is non-commercial. The method 200 is described below with reference to the architecture of FIG. 1A, though it will be appreciated that it may be implemented in different architectures.

At step 202, a request to enter identity information for validation by user 22 may be initiated by in-store platform 32. For example, a display of a standard POS terminal, or of a mobile POS terminal, of the in-store platform 32 may display a prompt to enter the identity information. In some embodiments, a mobile POS terminal may prompt user 22 to scan a document containing the identity information, such as a government-issued identity document (e.g., a passport, national ID card or driver's licence). For convenience, both a standard POS terminal and a mobile POS terminal will be referred to below as a "terminal" 33, and distinction will be drawn between the two only where necessary. In the embodiment of FIG. 2, the standard POS terminal or mobile POS terminal may act as a requesting device to transmit an identity validation request on behalf of in-store platform 32.

At step 204, the user 22 provides identity information, for example, by entering an alphanumeric string using a keypad or touch screen of the terminal 33, or by scanning a document with a camera that is part of, or is attached to, the terminal 33. The user 22 may also simply provide an identity document to the merchant for performing the data entry. In other embodiments, identity information may be transmitted directly from a user 22's mobile device 18 to the terminal 33, for example, via a digital wallet application executing on the mobile device 18. In some embodiments, more than one set of identity information may be entered, for example, details relating to both a national ID card and a driver's licence may be entered.

Also as part of step 204, a payment credential may be entered by the user 22 or by the merchant 30. For example, user 22 may tap, swipe or dip a payment card at the terminal 33 or at a payment card reader thereof, to cause the payment card credential to be read in conventional manner. Alternatively, a PAN of the payment card may be entered manually at the terminal 33. In another variation, a contactless device that carries a tokenized payment credential of the user 22 may be tapped at a contactless reader of the terminal, to initiate a transaction using a payment token that is associated with the contactless device and/or with a digital wallet application executing on the contactless device. Examples of contactless devices are smart phones, smart watches, fobs, and wearable devices, such as rings or bracelets that carry NFC circuitry configured for contactless payments.

The payment credential, or the tokenized payment credential, may be entered prior to or after entry of the identity information at in-store platform 32. To this end, the terminal 33 may be configured such that it does not send any request until it receives both the (tokenized) payment credential and the identity information.

At step 206, the in-store platform 32, for example via terminal 33, generates a verification service request message. The verification service request message may be formatted according to ISO 8583 or ISO 20022, for example. In one example, the verification service request message is an account status inquiry (ASI) message. The identity information entered at step 204 may be encoded in a private data field, such as data element (DE) 48 in the case of an ISO 8583-formatted ASI message.

Still at step 206, the verification service request message is transmitted by the terminal 33 to identity service 26. This is typically done indirectly, by the terminal 33 first transmitting the verification service request message to the merchant's acquirer 15, which then transmits it to payment network 20 of identity validation system 14 in conventional fashion. The payment network 20 receives the verification service request message, and detects that it is an identity validation request. The payment network 20, on receiving the verification service request message, may first scan any data fields that may indicate that the verification service request message is a non-standard verification service request message. For example, the payment network 20 may check whether a private data element, such as DE 48, of an ISO 8583 message contains any data, and if so, flag the message as an identity validation request.

On detecting that the verification service request message is an identity validation request, the payment network 20 may identify the issuer of the payment credential, for example, by performing a BIN lookup on the first few digits (typically, the first 6 digits) of the payment credential. The payment network 20 may then route the request to identity service 26.

Identity service 26 may check, in data store 28, whether the issuer identified by the payment network 20 supports identity validation. If it does not, identity service 26 returns a decline message (typically in the same format as that of the verification service request message, e.g., ISO 8583 format) with a message code indicating that identity validation is unsupported. The decline message is returned to terminal 33, via payment network 20 and acquirer 15, and an indication of the decline and the reason for it may be displayed on terminal 33.

If the issuer 16 does support identity validation, the identity service 26 transmits the verification service request message to the issuer 16. If the payment credential in the verification service request message is not tokenized then the identity service 26 may transmit the verification service request message directly to the issuer 16. On the other hand, if the payment credential is a tokenized payment credential, identity service 26 first transmits, at step 207, the verification service request message to token service 40, so that token service 40 can detokenize the tokenized payment credential and transmit the verification service request message with the linked payment credential (PAN) to the issuer 16 at step 208.

At step 210, the issuer 16 may check whether the payment credential of user 22 is enrolled for identity validation. If user 22 is enrolled, in some embodiments, the issuer 16 may perform an identity validation process to validate the identity information in the verification service request message. If the user 22 is not enrolled for identity validation, the issuer 16 may simply respond with a decline message.

As part of the identity validation process, issuer 16 may retrieve, in a lookup operation, account information for user 22, based on the payment credential submitted as part of the verification service request message. The account information may comprise independently validated identification data, such as a passport number, driver's licence number, national ID number, etc. The independently validated identification data may have been provided by user 22 at the time of creating their account, and has been manually or automatically checked by issuer 16 as part of a KYC process, for example.

Once issuer 16 has retrieved the independently validated identification data, it may be compared against the unvalidated identity information data in the verification service request message to check whether the identity information data in the verification service request message matches what is already on record. For example, if there are multiple items of identity information on record, each one of them can be compared against the identity information data in the verification service request message to check for an exact match. If there are multiple items of identity information data in the verification service request message, issuer 16 may require an exact match for each one with one of the multiple items of identity information on record.

Optionally, at steps 212-216 and as shown in dotted lines, a user verification process may be performed by issuer 16. This may be performed either before or after the identity validation process discussed in the previous paragraphs.

In the user verification process, at step 212, the issuer 16 may generate a request for user verification of the identity validation request, and send the request to device 18 of user 22, using a previously configured out-of-band channel (typically, a one-time passcode sent to the user's mobile phone number or email address, or to a mobile banking application executing on the user's device 18) of user 22, details of which are stored in association with the user 22's account at issuer 16. This is important for obtaining permission from the user 22 to perform the request as well as to verify that the request originated from the user 22.

At step 214, the mobile device 18 receives the user verification request and prompts the user 22 to verify the request. For example, this may be by requesting the user 22 to enter a password associated with an account or by sending a one-time password to the mobile device 18 and requesting that the user 22 enters the one time password in a digital wallet application or mobile banking application executing on mobile device 18.

The response from the mobile device 18 is sent back to issuer 16 at step 216. If the user verification is unsuccessful, a decline message is sent to terminal 33, via payment network 20 (optionally, via token service 40 if applicable) and acquirer 15.

At step 218, the issuer 16 transmits the results of the identity validation process to identity service 26.

For example, if there is a match (for all identity information in the verification service request message), then the identity of the user 22 is considered to be validated and the issuer 16 sends a verification service response message indicating an approved status to the identity service 26. This may be sent directly to the identity service 26, or as depicted in FIG. 2, may be sent to token service 40 at step 218 to re-tokenize the payment credential, with the verification service response including the re-tokenized payment credential then being sent by token service 40 to identity service 26 at step 219. For example, the verification service response may simply comprise a "00" response code that indicates approval without any further information, thus indicating to terminal 33 that the request was approved and that the user 22's identity information is therefore valid. In some embodiments, further information may be included in the verification service response. For example, a code indicative of the type of identity information that matched with the information on record may be included.

When the identity service 26 receives the verification service response, it may generate a session number, at step 220. The session number may be used to keep track of previously validated identity information, and may be transmitted to the merchant's in-store platform 32 (step 222) so that the merchant can retain it as proof of validation. This may be useful for audit purposes, for example.

Figure 3:
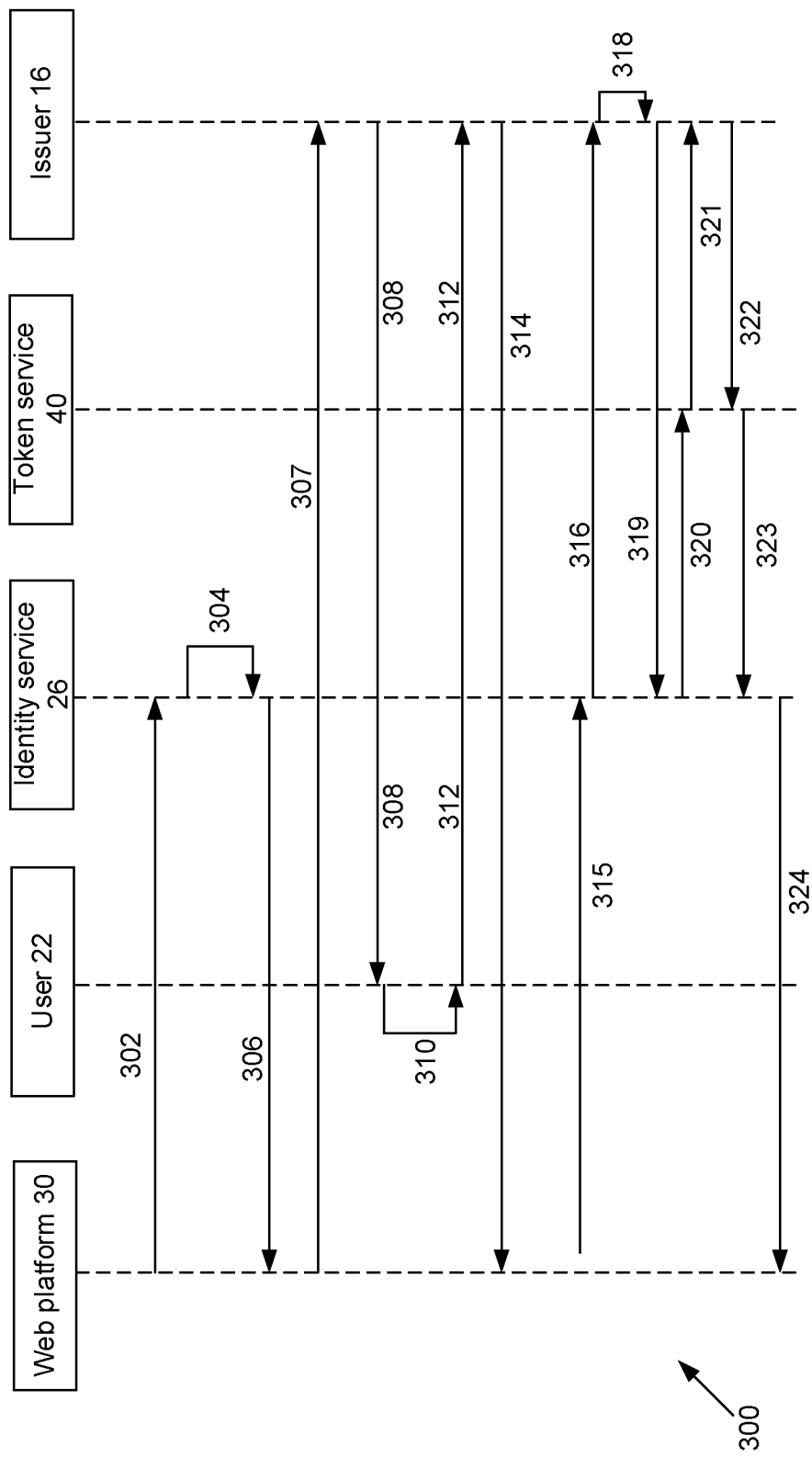
FIG. 3 is a sequence diagram of another embodiment of a process for identity validation.

In an alternative embodiment of a method 300 for identity validation in an online environment, as shown in FIG. 3, instead of forming an ISO message for a verification service request (e.g., in accordance with the ISO 8583 or ISO 20022 standards), the web platform 30 may directly communicate with identity service 26, by sending a request via API 24. The method 300 is described below with reference to the architecture of FIG. 1B, though it will be appreciated that it may be implemented in different architectures. In the embodiment of FIG. 3, a computing device of the web platform 30 acts as a requesting device to transmit a request for identity validation.

At step 302, the web platform 30 initiates an identity validation request for user 22 at identity service 26, via the API 24. The identity validation request comprises a payment credential of user 22, and identity information that the merchant operator of web platform 30 wishes to validate.

The payment credential may be entered by user 22 at the web platform 30. Alternatively, the payment credential may already be stored at the web platform 30, and retrieved by web platform 30 when user 22 logs in at web platform 30 to access their account (card on file). The actual payment credential, such as a PAN of a payment card, may be stored at the web platform 30. Alternatively, a tokenized form of the payment credential (referred to herein as a payment token) may be stored at the web platform 30, to reduce the risk of fraud if the web platform 30 is compromised. As before, the payment token can be detokenized, at token service 40 and as needed, for issuer 16 to process the identity validation request.

Similarly, the identity information may be entered by user 22 at the web platform 30, if not already stored at the web platform 30.

At step 304, identity service 26 stores the payment credential as session information, and retrieves an address of an access control server of issuer 16, transmitting this address to the merchant 30 at step 306.

At step 307, merchant 30 sends a user verification request to the address of the access control server of issuer 16. This triggers a user verification process. To this end, steps 308, 310 and 312 in FIG. 3 may be performed in substantially identical fashion to steps 212, 214 and 216 of FIG. 2 (as described above), respectively.

At step 314, the access control server of issuer 16 returns the user verification result to merchant 30. If the user verification result is negative, the request is declined and a decline message is displayed to the user 22.

Otherwise, at step 315, the merchant 30 generates a verification service request message that comprises the payment credential, the identity information that is to be verified, and the positive user verification result, and transmits the verification service request message to identity service 26. For example, the verification service request message can be an ISO 8583 or ISO 20022 message, and the identity information can be stored in a private field, such as DE 48. The verification service request message may also comprise a transaction score that is generated based on data relating to the request. For example, the transaction score may be indicative of a confidence level that the transaction is being carried out by the actual cardholder (as opposed to an unauthorized person, such as an underage relative), and may be computed based on merchant location, previous transactions conducted with the same merchant or the same merchant type, and so on. For example, a transaction being conducted in a merchant location or with a merchant that has not previously appeared in transaction records for the account associated with the payment credential may receive a lower score.

At step 316, the identity service 26 receives the verification service request message, and validates it by confirming that it contains a positive user verification result. The verification service request message is then sent to issuer 16 for processing.

At step 318, as before, the issuer 16 conducts an identity validation process by comparing the received identity information in the verification service request message to the identity information on file (as retrieved via a lookup operation), and if there is a match (for all identity information in the verification service request message), then the identity of the user 22 is considered to be validated and the issuer 16 sends a verification service response message indicating an approved status to the identity service 26, at step 319. The identity validation process may also take into account the transaction score generated at step 304.

For example, the verification service response may simply comprise a "00" response code that indicates approval without any further information, thus indicating to identity service 26 that the request was approved and that the user 22's identity information is therefore valid. In some embodiments, further information may be included in the verification service response. For example, a code indicative of the type of identity information that matched with the information on record may be included.

At step 320, identity service 26 may initiate an on-behalf token request to token service 40 to request generation of an identity token that indicates that the identity information has been validated.

Token service 40 transmits a tokenization authorisation request to issuer 16, at step 321. The tokenization authorization request may comprise the identity information. It may also comprise merchant-specific information, such as a merchant identifier, merchant name, merchant location, type of goods sold, merchant account ID (e.g., user's account on the merchant site), and any other suitable information.

At step 322, in response to the request, the issuer 16 may approve digitisation of the identity information, and send an authorisation approval to the token service 40.

At step 323, having received the authorization approval, the token service 40 generates the identity token, and transmits it to the identity service 26. The identity token contains an identifier that is mapped to the identity information at the token service 40, and also contains the result of the identity validation process performed by issuer 16.

In one or more embodiments, the identity token may have domain controls applied thereto. For example, the identity token may be restricted to the channel (e.g., merchant 30) for which it was requested. Details of any such domain controls may be stored at token service 40 and/or issuer system 16. The identity token may also have a restricted lifetime such that it expires after a given period, for example.

At step 324, the identity service 26 transmits the identity token and the session number to the web platform 30. Accordingly, the identity token may be used by the merchant operator of web platform 30 to validate the user 22 when the user 22 next logs in, for example, to make an online purchase. The user 22 does not then need to re-validate their identity, for example, for age verification purposes, when performing a further transaction at the web platform 30.

Figure 4:
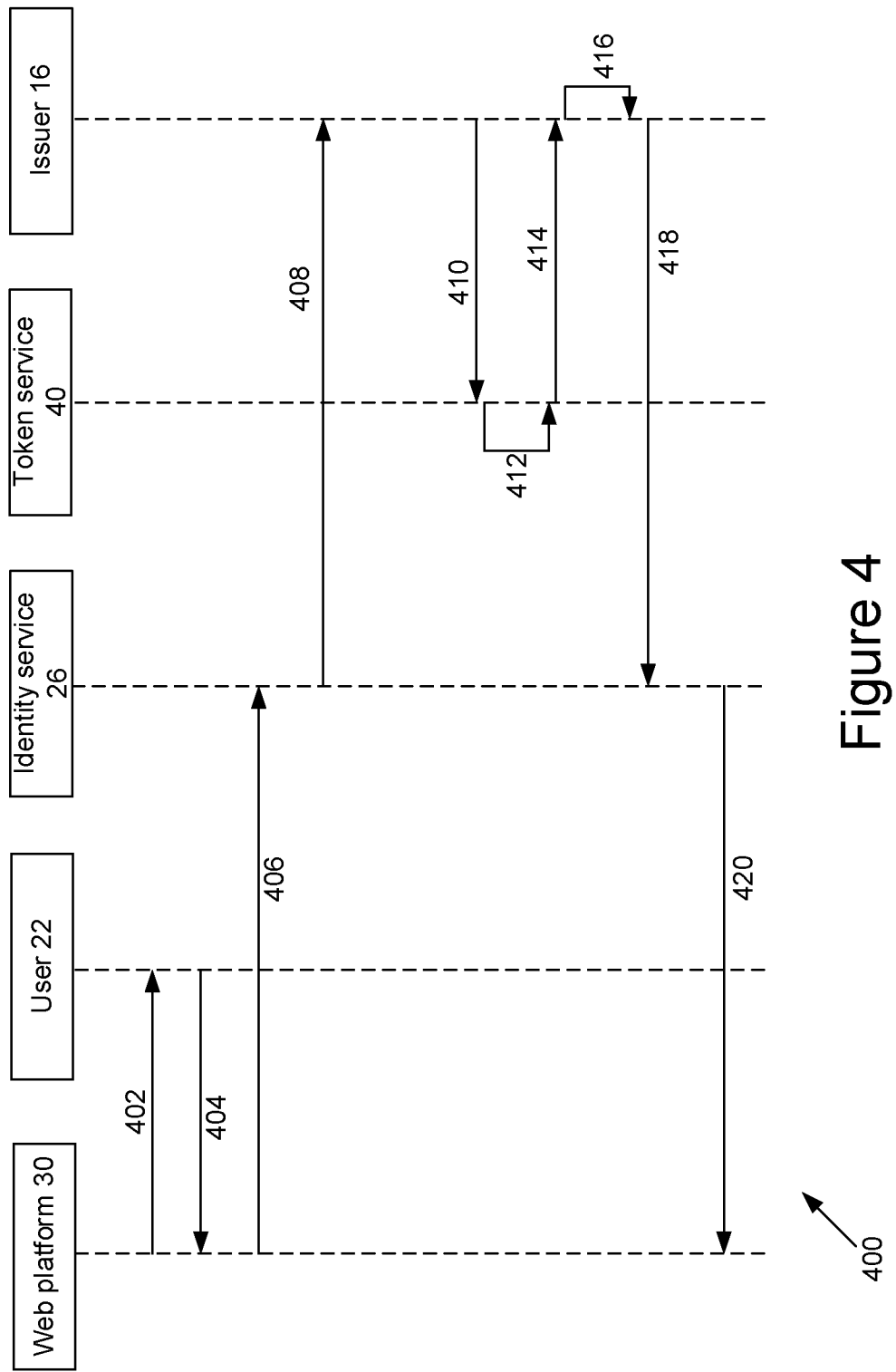
FIG. 4 is a sequence diagram of a revalidation process flow for a user who has already had their identity validated by the process of FIG. 3.

An example of an identity validation flow for a returning user 22 who has previously validated their identity at merchant 30, as in the process of FIG. 3, is illustrated in FIG. 4.

At step 402, merchant platform 30 prompts user 22 to verify their identity, and to this end, user 22 may select an option to use an identity token from a previous validation. This selection is sent to the merchant platform 30 at step 404.

At step 406, the merchant platform 30 transmits an identity validation request to identity service 26, the identity validation request comprising the identity token of the user 22.

At step 408, the request is forwarded by identity service 26 to issuer 16.

At step 410, the issuer 16 may check whether the identity token comprises an indication of a previous identity validation approval, and may also transmit, to token service 40, a request to detokenize the identity token.

Token service 40 detokenizes the identity token at step 412 such that the identity information to which the token is mapped can be retrieved. This is transmitted back to the issuer 16 at step 414.

At step 416, the issuer 16 receives the identity information, and checks whether it is still associated with the user 22's payment credential. The issuer 16 then generates a message indicating an approval (if still associated) or decline (if no longer associated) of the request.

At step 418, the message indicating the approval or decline is transmitted to identity service 26, which then forwards it to merchant platform 30 at step 420.

Identity Service 26

Figure 5:
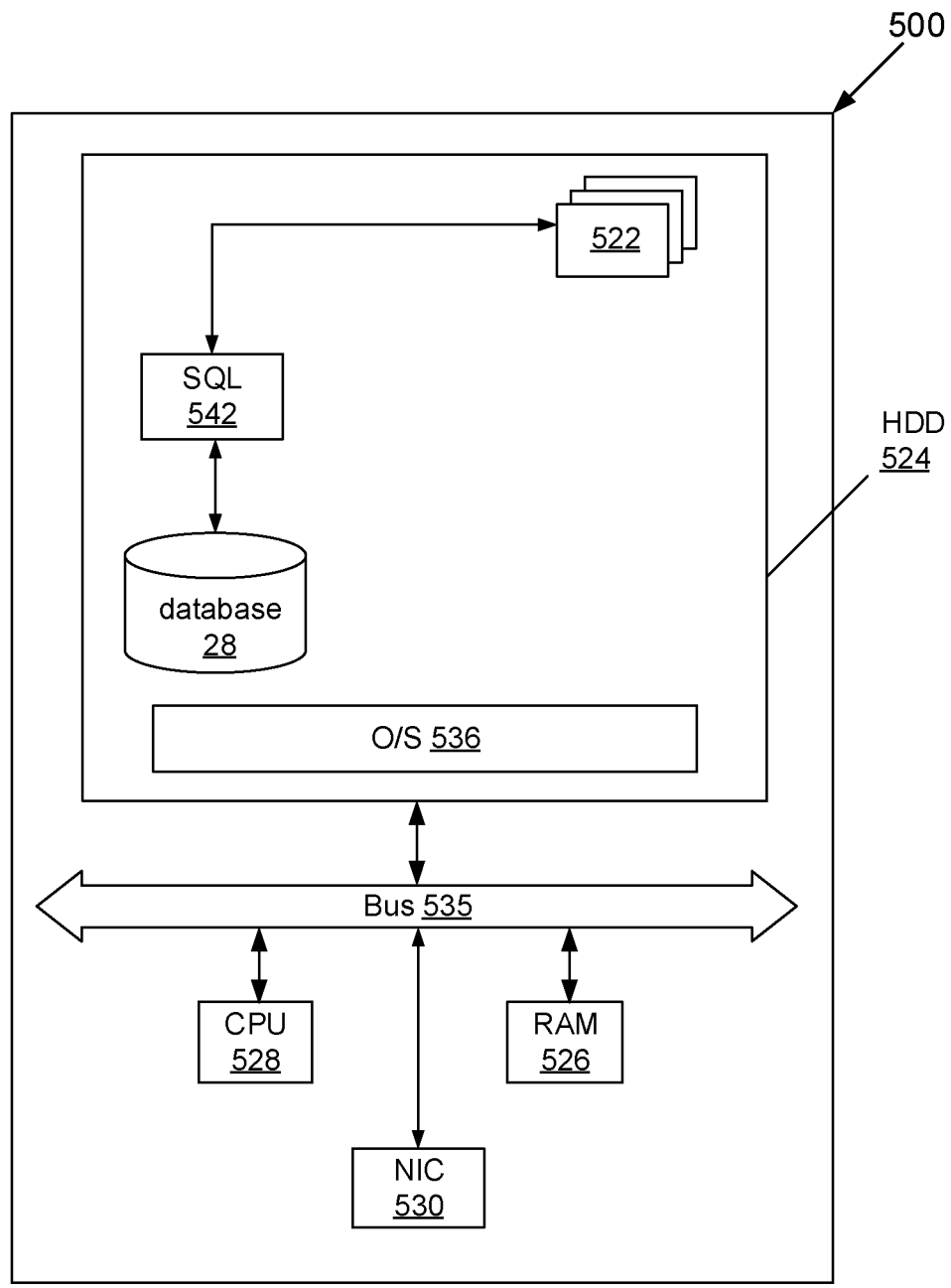
FIG. 5 is an architecture diagram of an identity service apparatus of the system of FIG. 1.

FIG. 5 shows an example computing device 500 that is capable of implementing an identity service 26 of the system 10. In some embodiments, multiple computing devices 500 may be considered to be a single system.

The components of the computing device 500 can be configured in a variety of ways. The components can be implemented entirely by software to be executed on standard computer server hardware, which may comprise one hardware unit or different computer hardware units distributed over various locations, which may communicate over a network. Some of the components, or parts thereof, may also be implemented by application specific integrated circuits (ASICs) or field programmable gate arrays.

In the example shown in FIG. 5, the computing device 500 is a commercially available server computer system based on a 32 bit or a 64 bit Intel architecture, and the processes and/or methods executed or performed by the computing device 500 are implemented in the form of programming instructions of one or more software components or modules 522 stored on non-volatile (e.g., hard disk) computer-readable storage 524 associated with the computing device 500. At least parts of the software modules 522 could alternatively be implemented as one or more dedicated hardware components, such as application-specific integrated circuits (ASICs) and/or field programmable gate arrays (FPGAs).

The computing device 500 comprises at least one or more of the following standard, commercially available, computer components, all interconnected by a bus 535: (a) random access memory (RAM) 526; (b) at least one computer processor 528, and (c) a network interface connector (NIC) 530 which connects the computer device 500 to a data communications network and/or to external devices.

The computing device 500 comprises a plurality of standard software modules, comprising: (a) an operating system (OS) 536 (e.g., Linux® or Microsoft® Windows); and (b) structured query language (SQL) modules 542 (e.g., MySQL®, available from http://www.mysql.com), which allow data to be stored in and retrieved/accessed from an SQL database 28.

Advantageously, the database 28 forms part of the computer readable data storage 524. Alternatively, the database 28 is located remote from the computing device 500 shown in FIG. 5.

The boundaries between the modules and components in the software modules 522 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the disclosure. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes 200, 300 and 400 performed by the identity service 26 may be executed by a module (of software modules 522) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device 500 normally processes information according to a program (a list of internally stored instructions, such as a particular application program and/or an operating system) and produces resultant output information via input/output (I/O) devices 530. A computer process typically comprises an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Figure 6:
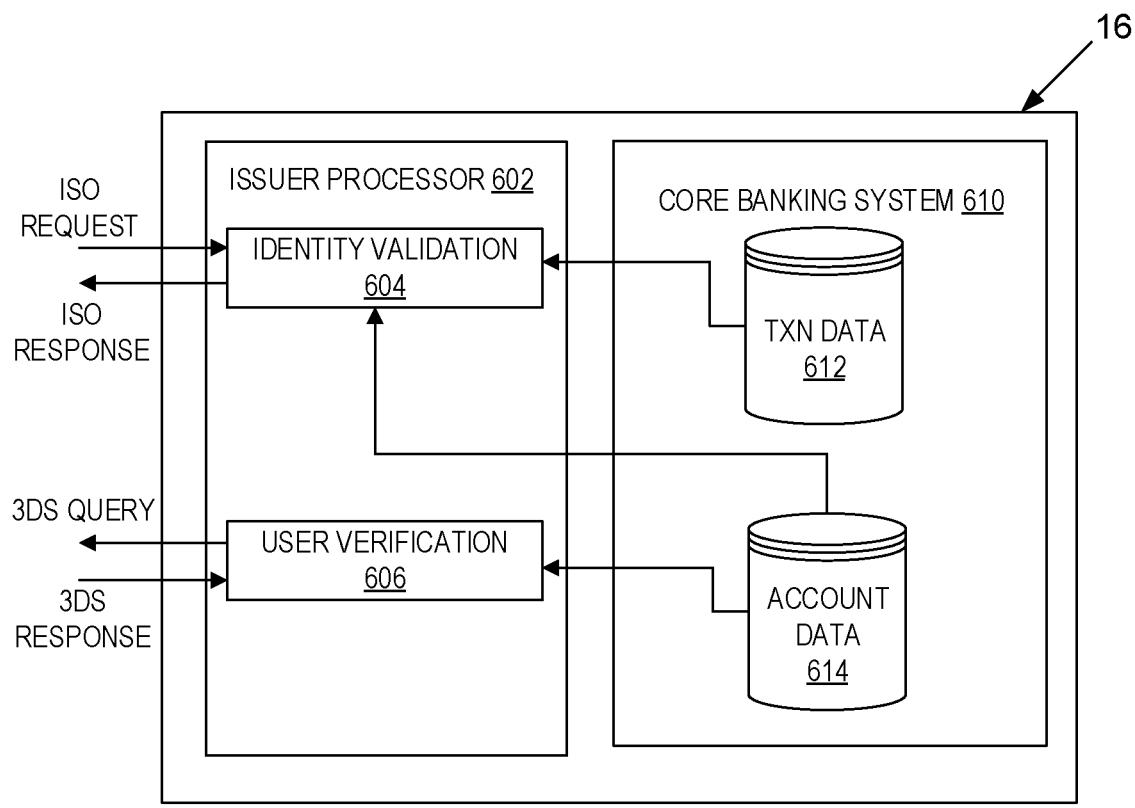
FIG. 6 is an architecture diagram of an issuer system of the system of FIG. 1.

FIG. 6 illustrates an exemplary architecture of an issuer system 16.

Issuer system 16 may comprise an issuer processor 602 that is in communication with a core banking system 610. In some embodiments, issuer processor 602 and core banking system 610 may be co-located on the same premises and/or be operated by the same entity.

Core banking system 610 comprises at least one data store that stores data relating to customer accounts, comprising payment card accounts. For example, a first data store 612 may store transaction data relating to transactions made with payment cards issued by the issuer 16, and a second data store 614 may store account data for customers, comprising payment card numbers (and related information, such as expiry dates, card verification values, credit limits, etc.), respective account balances corresponding to the payment cards, and KYC information comprising name, address, phone number, passport number, national ID, and the like. In some embodiments a single data store may store both the account data 614 and transaction data 612.

Issuer processor 602 comprises a number of modules for processing transactions, comprising non-financial transactions, such as account status inquiries of the type used in embodiments of the present disclosure. For example, issuer processor 602 may comprise an identity validation module 604 that receives ASI requests, validates the identity information in the ASI requests using input data from the account data store 614 (and in some embodiments, the transaction data store 612), and sends ASI responses back to a requestor, such as a merchant.

Issuer processor 602 may also comprise a user verification module 606 that is configured to perform a user verification process. User verification module 606 may transmit a verification request to an account-holder via a previously agreed channel, such as a mobile banking application, a mobile phone number provided by the account-holder when creating an account, or an email address (any or all of which may be stored in account data store 614 for retrieval by the user verification module 606). User verification module 606 also receives a verification response, such as a response to a prompt to provide a one-time passcode, from the account-holder, and verifies that the received response is the expected response. Conditional on the verification, the issuer system 16 may then perform another action, such as sending the ASI response. In some embodiments, the user verification process may be in accordance with a 3D-Secure (3DS) protocol, such as SecureCode® of Mastercard® International Incorporated.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An identity validation system comprising:
   at least one processor in communication with computer-readable storage, the computer-readable storage including instructions, which when executed by the at least one processor, cause the identity validation system to:
      receive, from a requesting device, an identity validation request, the identity validation request comprising identity data for a user and a payment credential;
      determine, from the payment credential, an issuer of the payment credential;
      determine, via a structured query language (SQL) database, that the issuer of the payment credential supports identity validation;
      retrieve an address of an access control server (ACS) of the issuer of the payment credential;
      transmit the address of the ACS to the requesting device, thereby permitting the requesting device to verify the user with the issuer via the ACS;
      receive a verification service request message from the requesting device, the verification service request message including the identity data for the user, the payment credential, and a positive user verification result associated with the ACS;
      validate the verification service request message based on the positive user verification result;
      transmit, to the issuer, the verification service request message;
      receive, from the issuer, a verification service response indicating whether or not the identity data has previously been associated with the payment credential; and
      in response to the verification service response indicating the identity data has previously been associated with the payment credential:
         receive, from a token service, an identity token including an identifier mapped to the identity data; and
         transmit, to the requesting device, the identity token, wherein the identity token is used by the requesting device to validate the user for subsequent interactions between the requesting device and the user.

2. The identity validation system according to claim 1, wherein the identity data comprises an identifier of an identity document.

3. The identity validation system according to claim 2, wherein the identity document is one of the following:
   a passport;
   a driver's license; or
   a government issued identity card.

4. The identity validation system according to claim 2, wherein the identity data includes a plurality of identifiers of respective identity documents; and
   wherein the verification service response comprises a positive indication as to validity of the identity data if all of the identifiers have previously been associated with the payment credential.

5. The identity validation system according to claim 1, wherein the instructions, which when executed by the at least one processor, further cause the identity validation system to generate a confidence score based on payment data associated with the payment credential; and
   wherein the indication of validity of the identity data includes the confidence score.

6. The identity validation system according to claim 1, wherein the instructions, which when executed by the at least one processor, cause the identity validation system to generate a session number to be sent to the requesting device for storage at the requesting device.

7. The identity validation system according to claim 1, wherein the verification service request message is an ISO 8583 or ISO 20022 message, and wherein the identity data is encoded in a private data field of the ISO 8583 or ISO 20022 message; and
   wherein the instructions, when executed by the at least one processor, further cause the identity validation system to:
      receive the verification service request message from the requesting device, via a payment network; and
      transmit, to the issuer, the verification service request message, via the payment network.

8. The identity validation system according to claim 1, further comprising:
   an issuer system configured to:
      parse the verification service request message to retrieve the identity data;
      match one or more identifiers in the identity data to identifiers that have previously been stored in association with the payment credential; and
      transmit a verification service response indicating whether or not the one or more identifiers in the identity data matches the identifiers that have previously been associated with the payment credential.

9. The identity validation system according to claim 8, wherein the issuer system is configured to, prior to matching the one or more identifiers, perform a user verification operation;
wherein the issuer system is further configured, in connection with performing the user verification operation, to:
retrieve communication data associated with the payment credential; and
send, to a user device, a request for user verification based on the retrieved communication data; and
wherein the issuer system is configured to match the one or more identifiers only upon receipt of a user verification from the user device.

10. The identity validation system according to claim 9, wherein the issuer system is further configured, in connection with performing the user verification operation, to:
match a received passcode with a passcode associated with the user; and/or
match received biometric data with biometric data associated with the user.

11. The identity validation system according to claim 10, wherein the passcode is a string of alphanumeric characters issued by the issuer system to the user device.

12. An identity validation method implemented by one or more processors, the method comprising:
receiving, from a requesting device, an identity validation request, the identity validation request comprising identity data and a payment credential;
determining, from the payment credential, an issuer of the payment credential;
determining, via a structured query language (SQL) database, that the issuer of the payment credential supports identity validation;
retrieving an address of an access control server of the issuer of the payment credential;
transmitting, to the requesting device, the address of the access control server;
receiving a verification service request message from the requesting device, the verification service request message comprising the identity data, the payment credential, and a positive user verification result;
validating the verification service request message based on the positive user verification result being included in the verification service request message;
transmitting, to the issuer, the verification service request message;
receiving a verification service response indicating whether or not the identity data has previously been associated with the payment credential; and
in response to the verification service response indicating the identity data has previously been associated with the payment credential:
receiving, from a token service, an identity token including an identifier mapped to the identity data; and
transmitting, to the requesting device, the identity token, wherein the identity token is used by the requesting device to validate the user for subsequent interactions between the requesting device and the user.

13. The identity validation method according to claim 12, wherein the identity data comprises an identifier of an identity document.

14. The identity validation method according to claim 13, wherein the identity document is one of the following:
a passport;
a driver's license; or
a government issued identity card.

15. The identity validation method according to claim 14, wherein the identity data includes a plurality of identifiers of respective identity documents; and wherein the verification service response comprises a positive indication as to validity of the identity data if all of the identifiers have previously been associated with the payment credential.

16. The identity validation method according to claim 12, further comprising generating a confidence score based on payment data associated with the payment credential; and
wherein the indication of validity of the identity data includes the confidence score.

17. The identity validation method according to claim 12, further comprising generating a token to be sent to the requesting device for storage at the requesting device.

18. The identity validation method according to claim 12, wherein the verification service request message is an ISO 8583 or ISO 20022 message, and wherein the identity data is encoded in a private data field of the ISO 8583 or ISO 20022 message; and
wherein transmitting, to the issuer, the verification service request message includes transmitting, to the issuer, the verification service request message via a payment network.

* * * * *